US00RE48037E

(19) United States
(12) Reissued Patent
Marina et al.

(10) Patent Number: US RE48,037 E
(45) Date of Reissued Patent: Jun. 9, 2020

(54) CAP AND CONTAINER

(71) Applicant: PepsiCo, Inc., Purchase, NY (US)

(72) Inventors: Carlos Hernan Marina, Deerfield Beach, FL (US); Jorge Manuel Maquita Nakano, Distrito Federal (MX); Tucker Fort, Brooklyn, NY (US); Carlos Francisco Gomez, Querétaro (MX); Paul Katz, New York, NY (US); Jacob Pamborg, New York, NY (US); Christopher R. Xydis, New York, NY (US)

(73) Assignee: PepsiCo, Inc., Purchase, NY (US)

(21) Appl. No.: 29/620,463

(22) Filed: Nov. 18, 2016

Related U.S. Patent Documents

Reissue of:
(64) Patent No.: Des. 717,651
Issued: Nov. 18, 2014
Appl. No.: 29/460,549
Filed: Jul. 11, 2013

(51) LOC (12) Cl. ..... 09-07
(52) U.S. Cl.
USPC ..... D9/454; D9/519
(58) Field of Classification Search
USPC .... D7/300, 392.1, 396.2, 703; D9/434, 435, D9/436, 440, 441, 447, 449, 499, 454
(Continued)

(56) References Cited

U.S. PATENT DOCUMENTS

D281,758 S * 12/1985 Trombly ..... D7/391
D286,026 S * 10/1986 Rayner ..... D9/435
(Continued)

FOREIGN PATENT DOCUMENTS

CA 154626 11/2014
WO 2013/103589 7/2013

*Primary Examiner* — Philip S Hyder
(74) *Attorney, Agent, or Firm* — Sterne, Kessler, Goldstein & Fox P.L.L.C.

(57) CLAIM

The ornamental design for a cap *and container*, as shown and described.

DESCRIPTION

FIG. 1 is a top perspective view of a cap *and container* showing our new design;
FIG. 2 is a front view thereof;
FIG. 3 is a right side view thereof;
FIG. 4 is a rear view thereof;
FIG. 5 is a left side view thereof;
FIG. 6 is a top view thereof;
FIG. 7 is a bottom view thereof;
FIG. 8 is a bottom, front, right perspective view thereof;
FIG. 9 is a top perspective view thereof shown in an exemplary unclaimed environment;
FIG. 10 is a top perspective view thereof shown in an exemplary unclaimed environment; [and,]
FIG. 11 is a right side view thereof shown in an exemplary unclaimed environment[.];
*FIG. 12 is a top perspective view of the container and cap;*
*FIG. 13 is a side view thereof; and,*
*FIG. 14 is a top perspective exploded view thereof.*
The broken lines immediately adjacent to the shaded area represent unclaimed boundaries of the design. The broken lines showing the remainder of the cap are for environmental purposes only and form no part of the claimed design.

1 Claim, 10 Drawing Sheets

Figure 1:
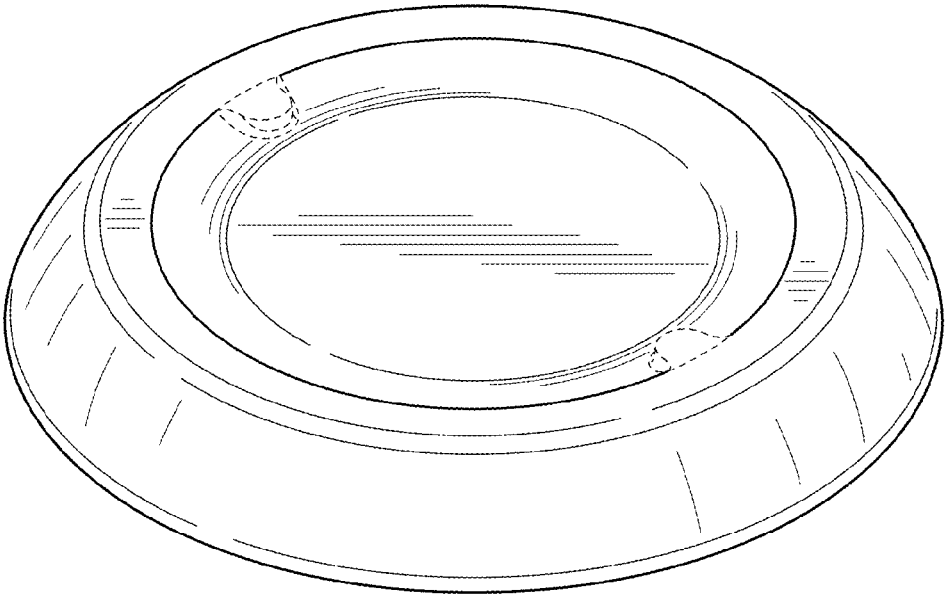
Figure 2:
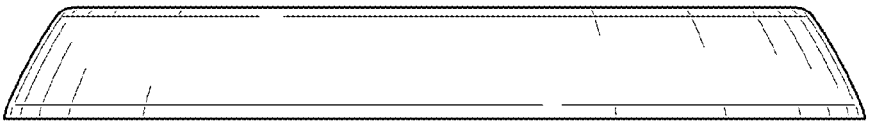
Figure 3:
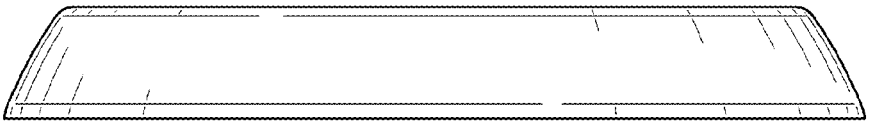
Figure 4:
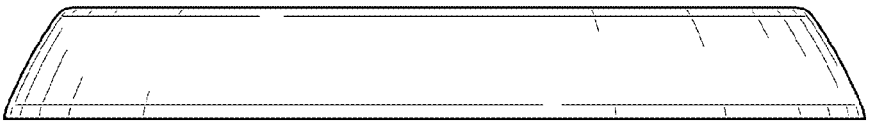
Figure 5:
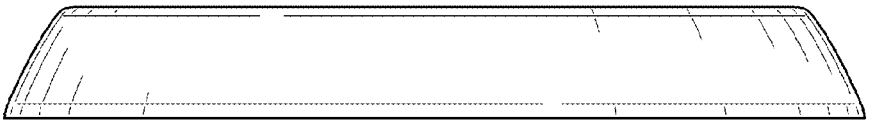
Figure 6:
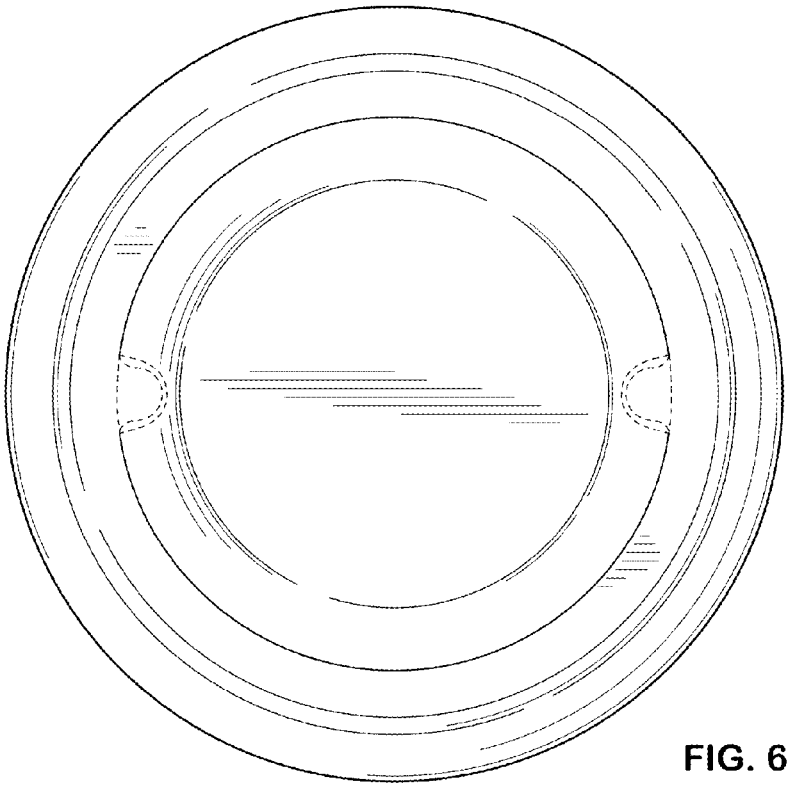
Figure 7:
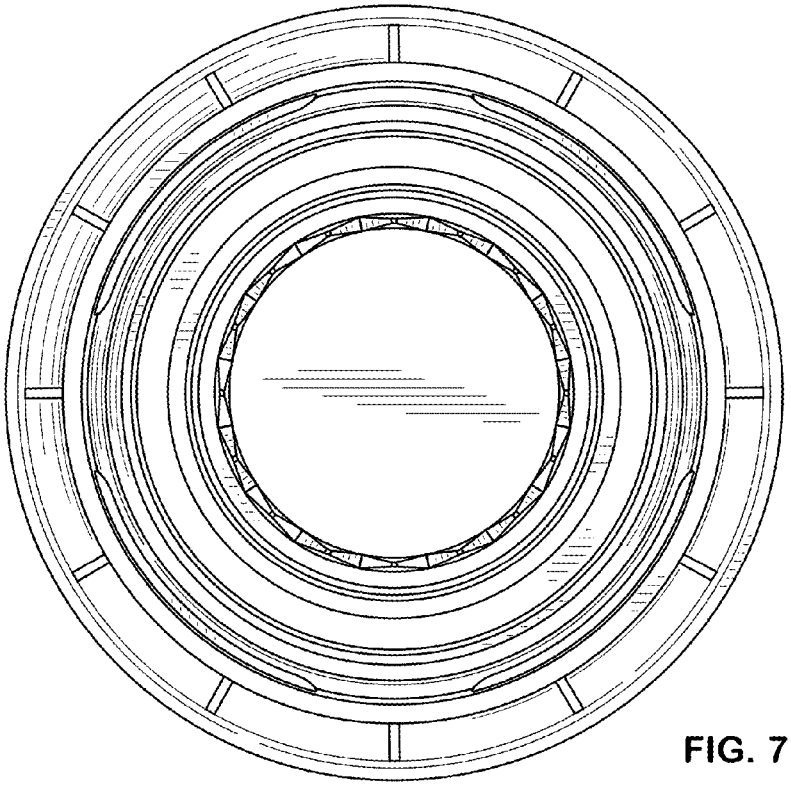
Figure 8:
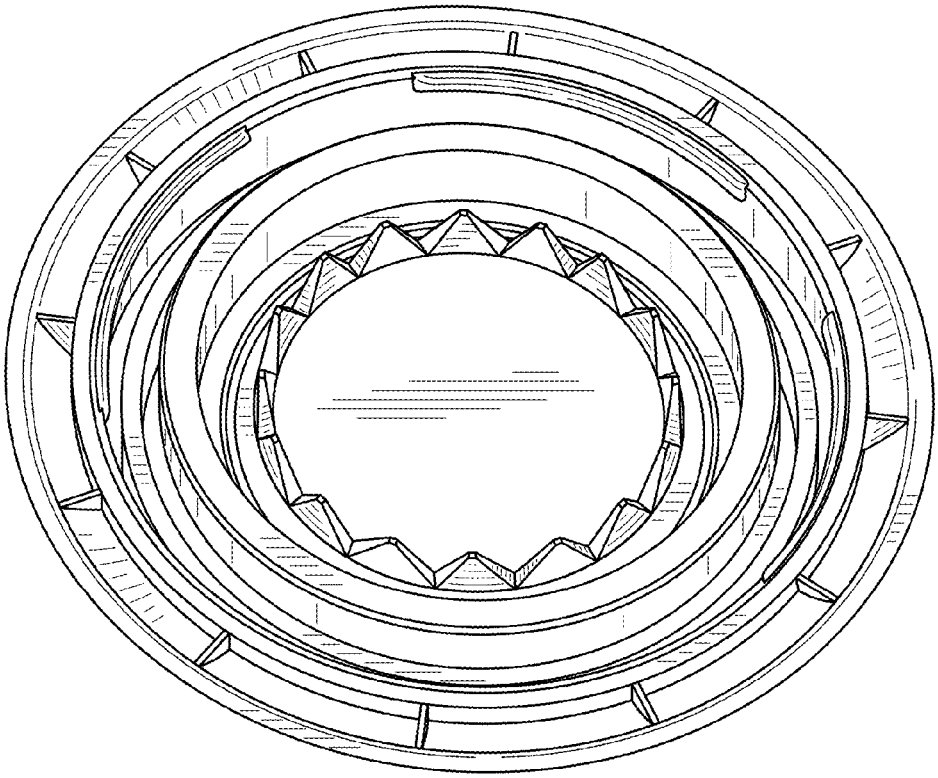
Figure 9:
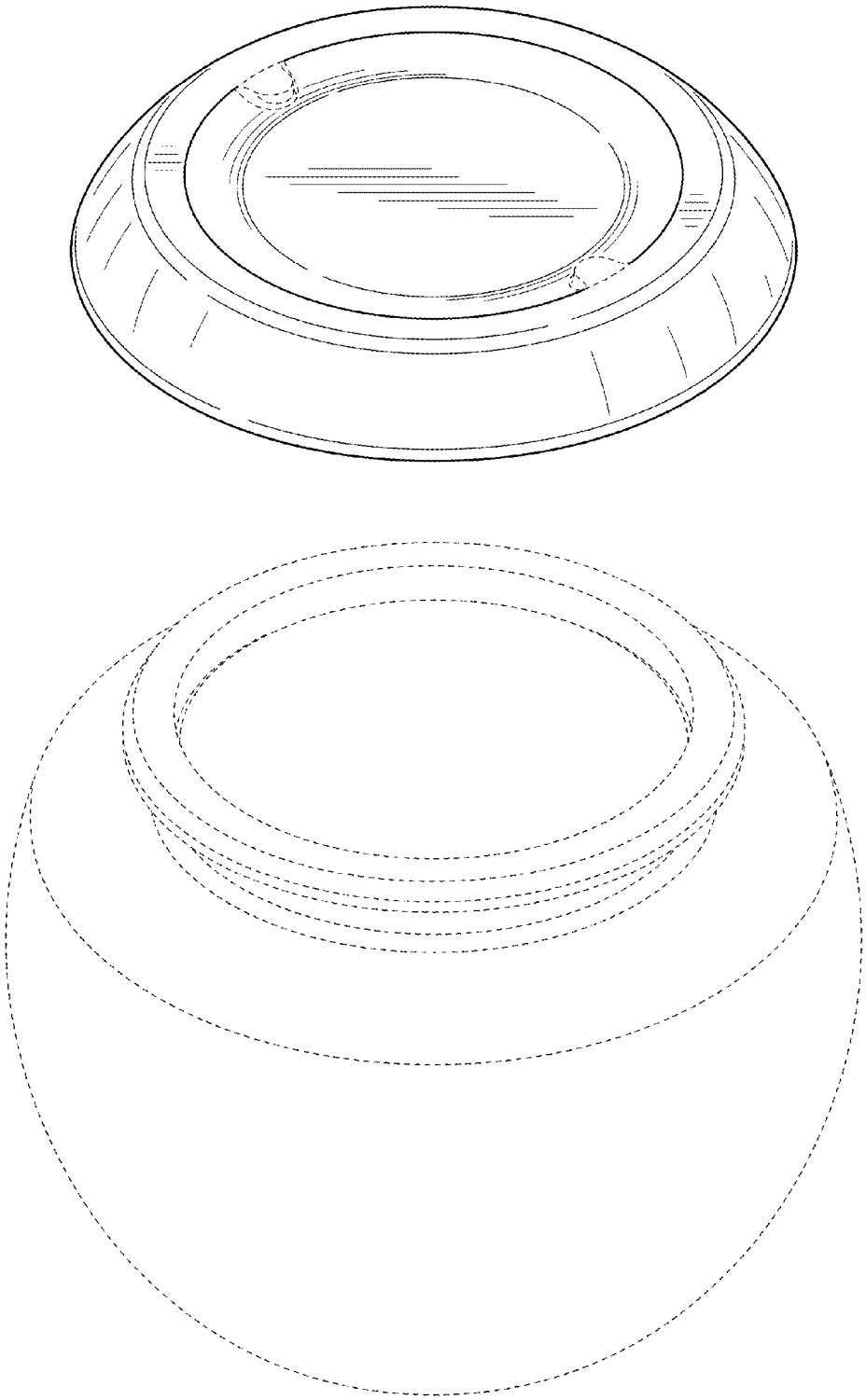
Figure 10:
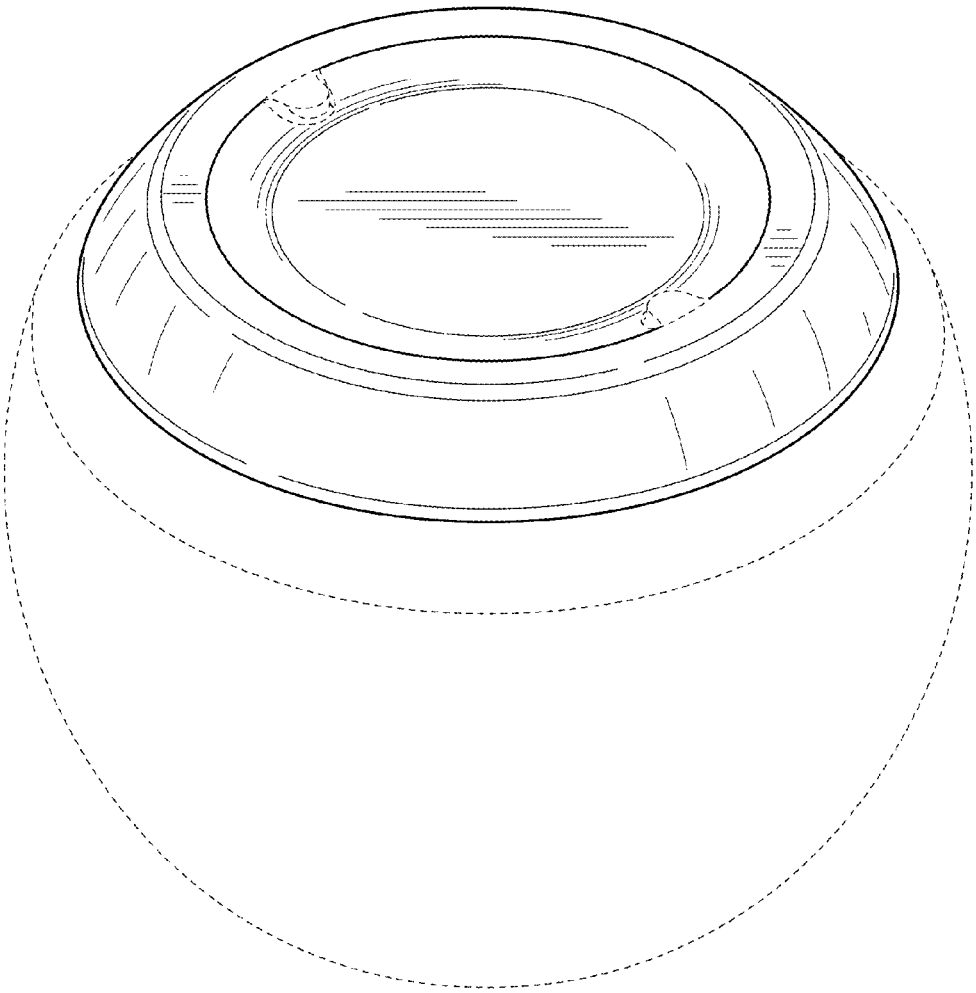
Figure 11:
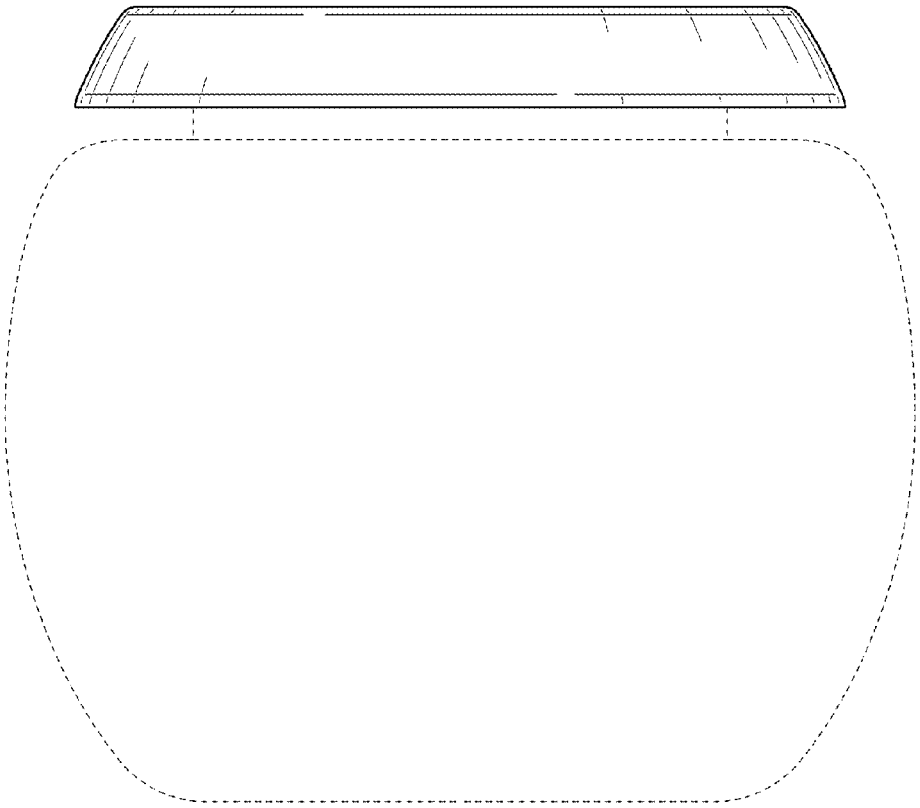

Matter enclosed in heavy brackets [ ] appears in the original patent but forms no part of this reissue; matter printed in italics indicates the additions made by reissue.

*(NEW)*

(58) Field of Classification Search
CPC ..... B65D 39/0029; B65D 39/0005; B65D 41/00; B65D 41/28; B65D 41/02; B65D 4/0464; B65D 41/0471; B65D 43/00; B65D 43/02; B65D 51/02; B65D 51/04; B65D 51/041; B65D 23/00
See application file for complete search history.

(56) References Cited

U.S. PATENT DOCUMENTS

| | | | | | |
|---|---|---|---|---|---|
| D289,259 | S | | 4/1987 | Strand | |
| D298,592 | S | | 11/1988 | Stoop | |
| D309,109 | S | * | 7/1990 | Allen | D9/435 |
| D373,727 | S | * | 9/1996 | Lowry | D9/445 |
| D381,267 | S | * | 7/1997 | Rush et al. | D9/452 |
| D381,268 | S | * | 7/1997 | Rush et al. | D9/452 |
| D417,584 | S | * | 12/1999 | Lillelund et al. | D7/392.1 |
| D474,978 | S | | 5/2003 | Varlet | |
| D475,573 | S | * | 6/2003 | Jalet et al. | D7/392.1 |
| 6,574,883 | B2 | | 6/2003 | Giblin et al. | |
| D528,359 | S | * | 9/2006 | Laib | D7/392.1 |
| D532,305 | S | | 11/2006 | Fellows et al. | |
| D552,473 | S | * | 10/2007 | Simkin | D9/516 |
| D561,030 | S | * | 2/2008 | Simkin | D9/519 |
| D570,212 | S | * | 6/2008 | Sussman | D9/444 |
| D572,535 | S | * | 7/2008 | El-Ghouyel | D7/500 |
| D588,870 | S | | 3/2009 | Rasmussen | |
| D605,523 | S | | 12/2009 | Dibnah et al. | |
| D610,009 | S | | 2/2010 | Prufer | |
| D622,835 | S | | 8/2010 | Mendheirn | |
| D641,209 | S | * | 7/2011 | Ablo | D7/392.1 |
| D650,677 | S | | 12/2011 | Wurster et al. | |
| D660,700 | S | * | 5/2012 | MacNeill | D9/445 |
| D664,853 | S | * | 8/2012 | Kipry | D28/73 |
| D675,528 | S | | 2/2013 | Beaver | |
| D676,276 | S | * | 2/2013 | Muspratt-Williams | D7/392.1 |
| D677,162 | S | * | 3/2013 | Sharma | D7/392.1 |
| D697,800 | S | * | 1/2014 | Villarreal | D28/82 |
| D699,578 | S | | 2/2014 | Marina et al. | |
| D701,767 | S | | 4/2014 | Marina et al. | |
| D732,978 | S | | 6/2015 | Kick | |
| D749,368 | S | | 2/2016 | Risso et al. | |
| D793,236 | S | * | 8/2017 | Santos | D9/454 |
| 2010/0055252 | A1 | | 3/2010 | Marina et al. | A47J 31/407 426/77 |
| 2011/0166910 | A1 | | 7/2011 | Marina et al. | B65D 51/2807 705/7.29 |
| 2012/0183657 | A1 | | 7/2012 | Marina et al. | A47J 31/407 426/394 |

* cited by examiner

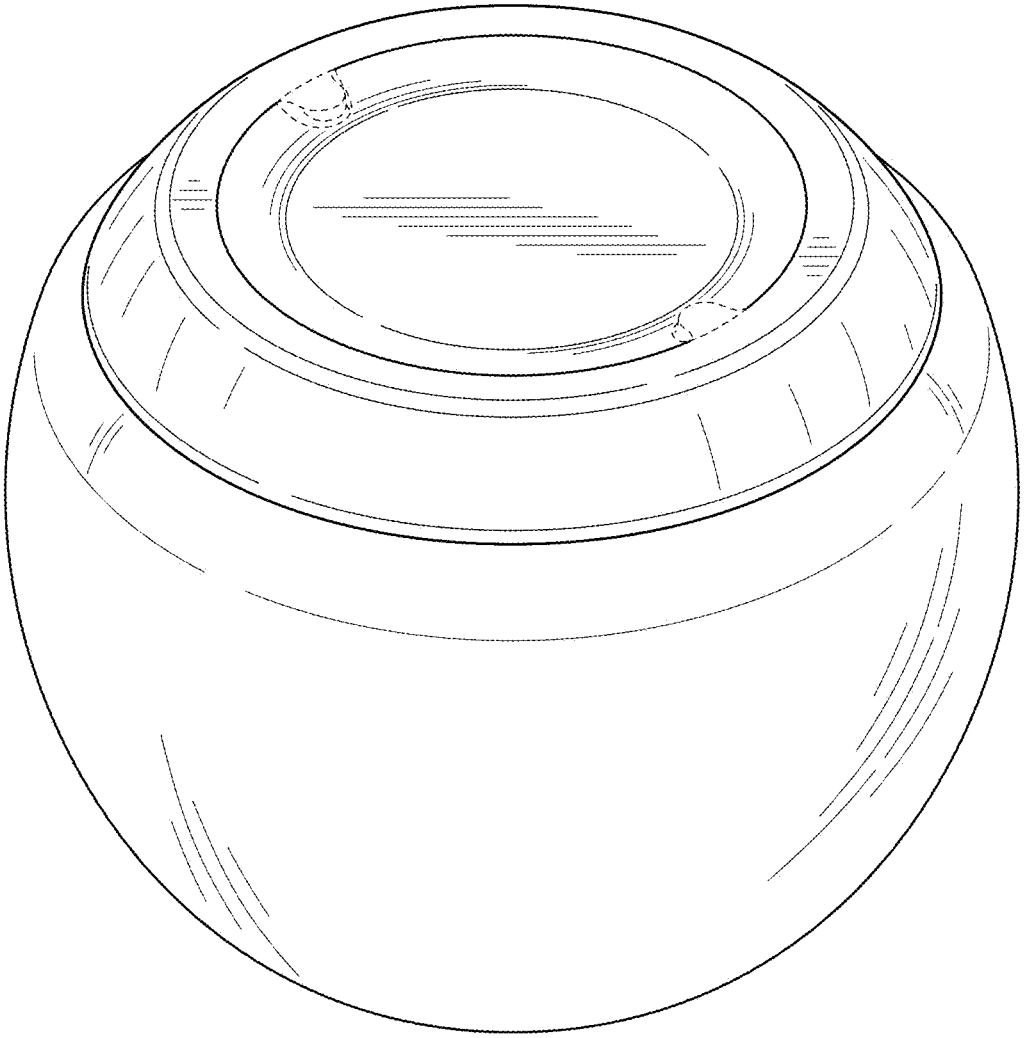
FIG . 12 (NEW)

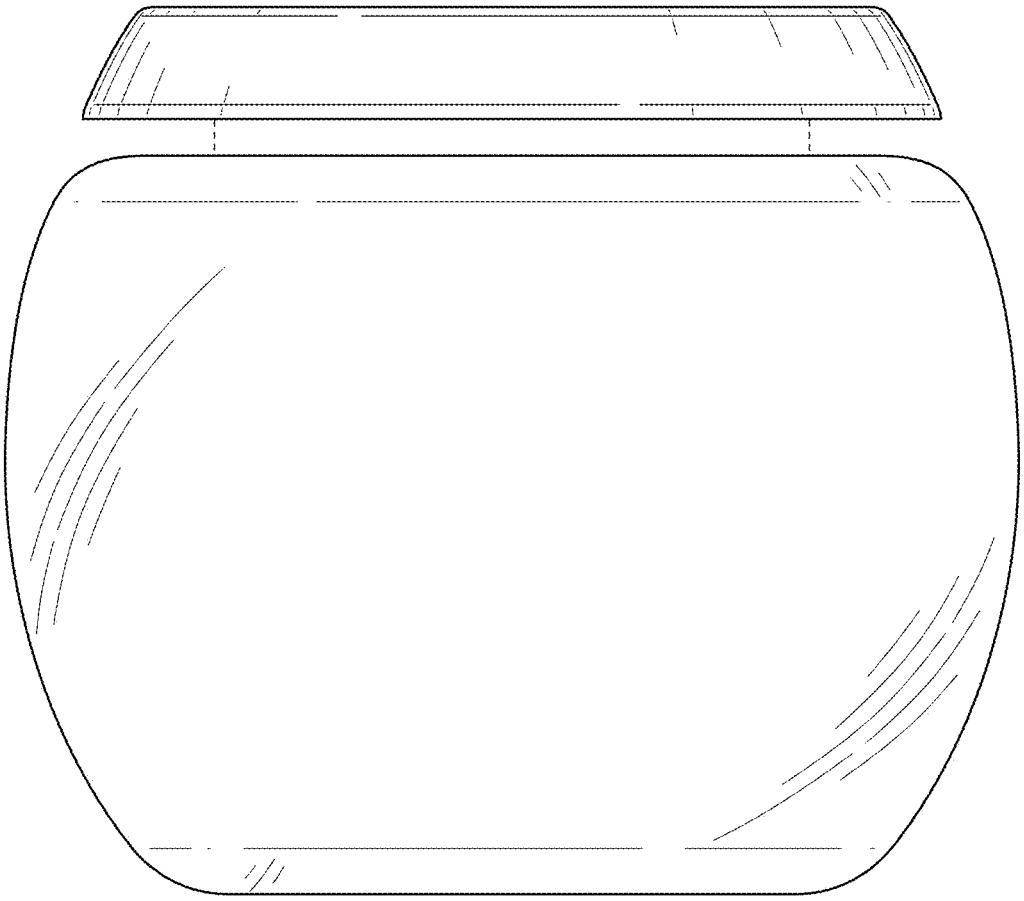
FIG . 13 (NEW)

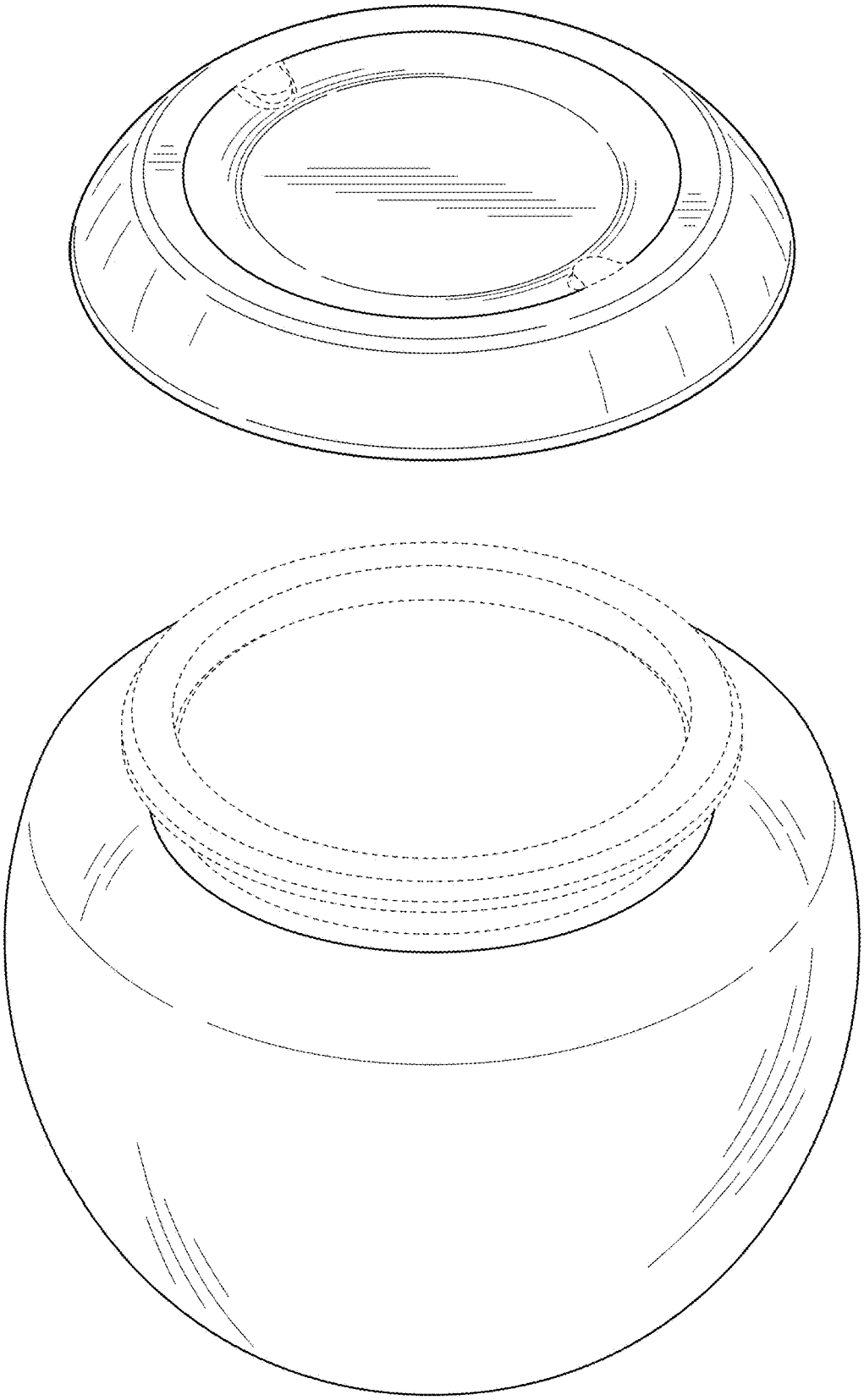
FIG . 14 (NEW)